United States Patent
Radke et al.

(10) Patent No.: US 8,193,772 B2
(45) Date of Patent: Jun. 5, 2012

(54) OVERVOLTAGE PROTECTION UTILIZED WHEN A BATTERY IS REMOVED FROM A SYSTEM

(75) Inventors: Russell Eliot Radke, Fort Collins, CO (US); Jay Edward Ackerman, Greeley, CO (US); Pieter Vorenkamp, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 418 days.

(21) Appl. No.: 12/060,675

(22) Filed: Apr. 1, 2008

(65) Prior Publication Data

US 2008/0246442 A1 Oct. 9, 2008

Related U.S. Application Data

(60) Provisional application No. 60/907,472, filed on Apr. 3, 2007.

(51) Int. Cl.
*H02J 7/00* (2006.01)

(52) U.S. Cl. .......................... 320/134; 320/162

(58) Field of Classification Search ............ 320/134
See application file for complete search history.

(56) References Cited

U.S. PATENT DOCUMENTS

| | | | | |
|---|---|---|---|---|
| 5,652,501 A | * | 7/1997 | McClure et al. | 340/636.15 |
| 5,652,502 A | * | 7/1997 | van Phuoc et al. | 702/63 |
| 2003/0132732 A1 | * | 7/2003 | Thomas et al. | 320/134 |
| 2006/0176013 A1 | * | 8/2006 | Watts | 320/107 |
| 2007/0127177 A1 | * | 6/2007 | Benton et al. | 361/90 |

* cited by examiner

*Primary Examiner* — Arun Williams
(74) *Attorney, Agent, or Firm* — Sterne, Kessler, Goldstein and Fox PLLC

(57) ABSTRACT

A system and method are provided for safely recharging a battery. A current source is coupled to a node and configured to produce a current. The battery is coupled to the node, and is configured to recharge during a recharging cycle based on receiving the current through the node. An overvoltage protection system is coupled between the node and the current source, and configured to disable the current source when a voltage at the node exceeds a threshold value. For example, the current source may be substantially instantaneously disabled when this occurs.

25 Claims, 3 Drawing Sheets

OVERVOLTAGE PROTECTION UTILIZED WHEN A BATTERY IS REMOVED FROM A SYSTEM

CROSS-REFERENCE TO RELATED APPLICATIONS

This application claims the benefit under 35 U.S.C. §119(e) to U.S. Provisional Patent Application No. 60/907,472, filed Apr. 3, 2007, which is incorporated herein by reference in its entirety.

BACKGROUND

1. Field of the Invention

The present invention is related to overvoltage protection.

2. Related Art

Handheld devices are increasingly powered by batteries, and typically rechargeable batteries. A recharging system of the handheld device is designed to minimize charge time of the rechargeable battery, while protecting the handheld device from damage caused by pushing too much current too fast into the rechargeable battery or charging the battery to too high a voltage. The handheld device also needs to be protected from overvoltage damage, which can result when a user removes the rechargeable battery during charging or when the rechargeable battery is dislodged, e.g., when the handheld device is accidentally dropped. When the rechargeable battery is dislodged during the charging cycle, and a power source used to allow for the fast charging produces a voltage that is above a rated voltage of the handheld device, the handheld device can almost instantaneously be destroyed.

Therefore, what is needed is a system and method that provide overvoltage protection for a handheld device if a rechargeable battery is removed or becomes dislodged from the handheld device during a recharging cycle, for example.

SUMMARY

An embodiment of the present invention provides a system comprising a current source, a rechargeable battery, and an overvoltage protection system. The current source is coupled to a node and configured to produce a current. The rechargeable battery is coupled to the node and is configured to receive the current through the node during a recharging cycle. The overvoltage protection system is coupled between the node and the current source, and is configured to disable the current source when a voltage at the node exceeds a threshold value.

Another embodiment of the present invention comprises a method including the following steps. A battery is recharged using a current flowing through a power node from a current source during a recharging cycle. A voltage at the power node is compared to a threshold voltage to produce a comparison signal. The current source is controlled based on the comparison signal, wherein when the voltage at the power node is above the threshold voltage the current source is disabled.

A further embodiment of the present invention provides a circuit comprising a current source section, a rechargeable battery, and an overvoltage protection section. The current source section is coupled between a power source and a power node. The rechargeable battery is configured to be recharged using a current from the current source flowing through the power node, the rechargeable battery being coupled between the power node and ground. The overvoltage protection section is coupled between the power node and the current source, and is configured to substantially instantaneously disable the current source when a voltage at the power node exceeds a threshold value.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

Figure 1:
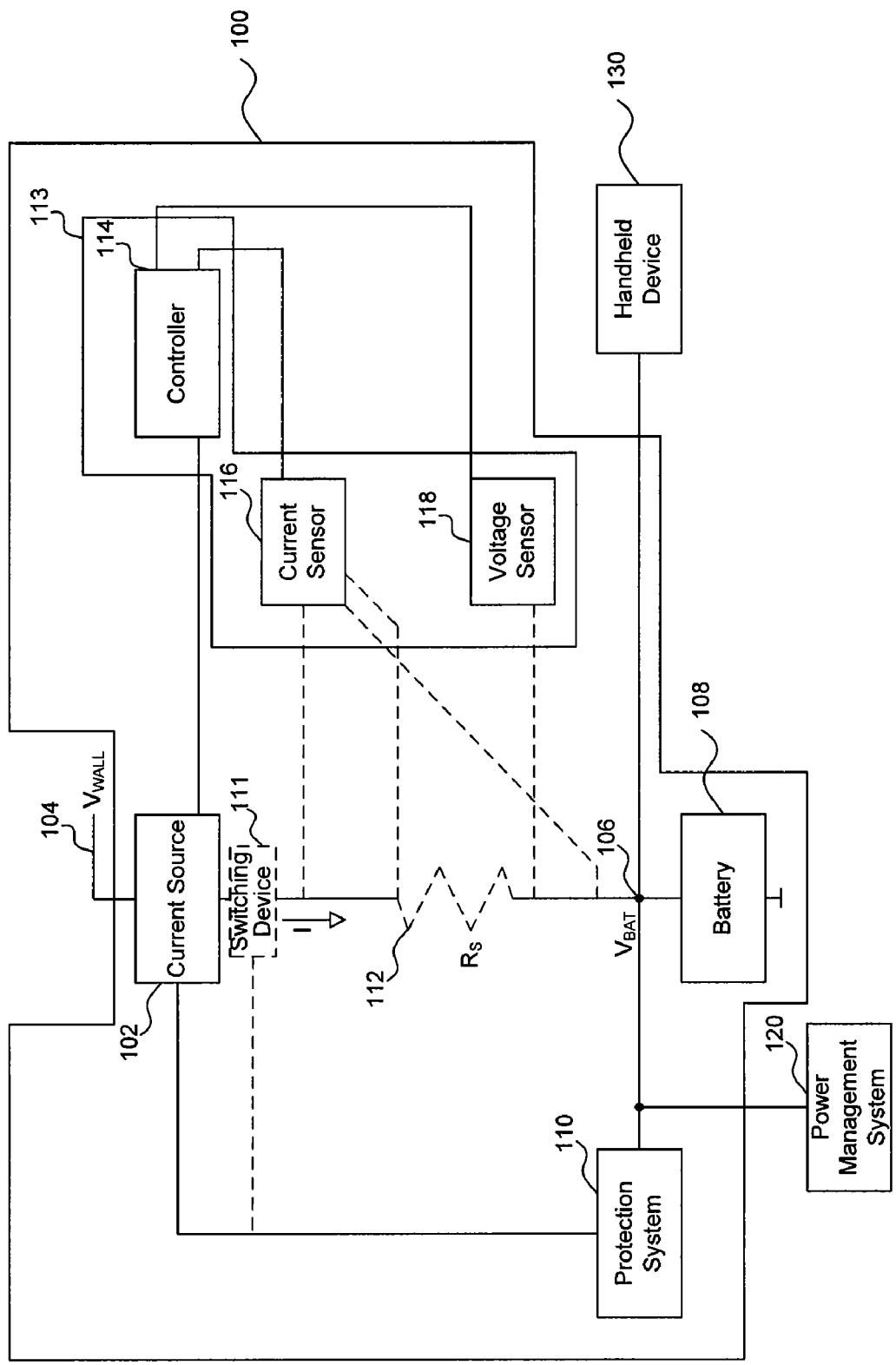
FIG. 1 shows a system, according to an embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention can be implemented in circuits, hardware, firmware, software, or any combination thereof.

Embodiments of the invention can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

FIG. 1 shows a system 100, according to an embodiment of the present invention. System 100 comprises a current source 102, which can be coupled between a first power source 104 (e.g., a power source supplying a high-voltage supply to the system) and a node 106 (e.g., a power node supplying Vbat or Vpower), a second power source 108 (e.g., a battery or a rechargeable battery) coupled to node 106, and a protection system 110 coupled between node 106 and current source 102.

In one example, current source 102 may be a transistor, e.g., a bi-polar or metal oxide silicon field effect transistor, possibly p-type, that produces a desired level of current I based on first power source 104.

Optionally, system 100 may include a switching device 111 coupled between current source 102 and node 106. For example, in overvoltage situations switching device 111 can receive a signal from protection system 110 to be turned OFF, stopping flow of current I from current source 102 to node 106, as discussed in more detail below.

Optionally, system 100 may include a resistive device 112 coupled between current source 102 and node 106, which may be used as a sensing resistor for a constant current and/or constant voltage procedure, discussed below.

Additionally, or alternatively, system 100 may include a sensing system 113 including a controller 114 coupled between current source 102 and a current sensor 116 and/or a voltage sensor 118.

Additionally, or alternatively, system 100 may be coupled to a power management system 120 and/or a handheld device 130 at node 106. As can be appreciated, other devices and systems may also be coupled to node 106 of system 100. In one example, power management system 120 may be used to manage power for system 100 and/or for handheld device 130. In one example, handheld device 130 may be, but is not limited to, a phone, a MP3 player, a CD player, a computer, a personal digital assistant, a video player, or the like.

In one example, power source 104 causes current source 102 to produce a current I that flows through node 106 in order to charge battery 108. As discussed above, if battery 108 is charged too quickly, it can be damaged. Therefore, in one example, a charging cycle (hereinafter referred to as charging cycle and recharging cycle, interchangeably) may be divided into a constant current procedure and a constant voltage procedure. These procedures can be controlled, for example, using sensing system 113. The process of using the constant voltage procedure may sometimes be referred to as a "slow loop" configuration, which allows for a charging cycle to end at the correct voltage. This is because the loop is too slow to regulate the charging current to zero when battery 108 is removed. Thus, when only using the slow loop, a voltage at node 106 quickly increases to a level of power source 104, which can cause damage.

In one example, the constant current procedure is performed during an earlier portion of the charging cycle, which can prevent battery 108 from being charged by current at a damaging rate. This may be accomplished through using current sensor 116 and controller 114. For example, a current flowing from current source 102 into node 106 is sensed using current sensor 116, which sensed current value is received by controller 114. Based on the sensed current value, controller 114 can control current source 102. In one example, the sensed current value may be associated with a current across sensing resistor 112, if sensing resistor 112 is incorporated into system 100.

Also, in this example, the constant voltage procedure is performed during a later portion of the charging cycle, which allows battery 108 to be accurately charged to its rated voltage, e.g. 4.5 volts. This may be accomplished using voltage sensor 118 and controller 114. For example, a voltage produced at node 106 is sensed using voltage sensor 118, which sensed voltage value is received by controller 114. Based on the sensed voltage value, controller 114 controls current source 102. In one example, the sensed voltage may be one or more voltages associated with resistor 112, if sensing resistor 112 is incorporated into system 100.

In one example, first power source 104 may produce voltages as high as about 10 to 18 volts, or other values based on various applications, to allow current source 102 to produce a desired level of current to quickly charge battery 108, e.g., about 1 A to 1.5 A, or other values based on various applications. When this much current is being used to charge battery 108, battery 108 may appear as about a 1000F to 3000F capacitor, or other values based on various applications. Thus, even with a high current, voltage changes very slowly in battery 108, and can be easily regulated using voltage sensor 118 and controller 114 loop to the final charging voltage, or the power management system 120, which may also regulate a voltage at node 106 to a safe level, for example below 5.5V.

If for some reason battery 108 is suddenly removed from system 100, e.g., a user pulls out battery 108 or battery 108 is accidentally dislodged when system 100 is dropped, the battery charger may not shut down the charging current I from current source 102 fast enough to avoid an over voltage condition at node 106. The over voltage condition can cause damage or destruction to power management system 120, handheld device 130, or system 100. This may be because, as discussed above, the loop that regulates current source 102 charging of the battery voltage to final rated value is a slow loop, sometimes a very slow loop. The slow loop will not notice that battery 108 has been disconnected fast enough. Without battery 108 coupled to node 106, node 106 may exhibit only about 10 µF to about 200° F., or other similar values. So when, for example, 1A flows into the 100 µF of node 106, the voltage at node 106 will rise as high as first power source 104, e.g., the 10 to 18 volts, almost instantaneously. Therefore, if node 106 is rated at 4.5V and the power management system 120, handheld device 130, and/or system 100 are rated at 5.5V (e.g., operate at most about 5.5V), and node 106 rises to 10 to 18 volts, power management system 120, handheld device 130, and/or system 100 can be destroyed almost instantaneously.

This situation can be avoided through the use of protection system 110. For example, if the voltage at node 106 exceeds a threshold voltage, protection system 110 can substantially instantaneously disable or shut down current source 102, i.e., make current source 102 appear as an open circuit so that first power source 104 is no longer connected to node 106. In this example, protection system 110 can be considered a fast overvoltage loop. By allowing for substantially instantaneous disabling or shutting down of current source 102 when a voltage at node 106 exceeds a threshold voltage, a voltage at node 106 is limited to the threshold voltage (e.g., 5.5V), which can be set to below the rated voltage (e.g., 5V) of one or both of power management system 120 or handheld device 130, thus preventing damage to them during this situation. In one example, disabling of current source 102 can occur in nanoseconds or microseconds, e.g., substantially instantaneously, which is needed because, in some configurations, damage from overvoltage can occur as soon as 20 µs.

Figure 2:
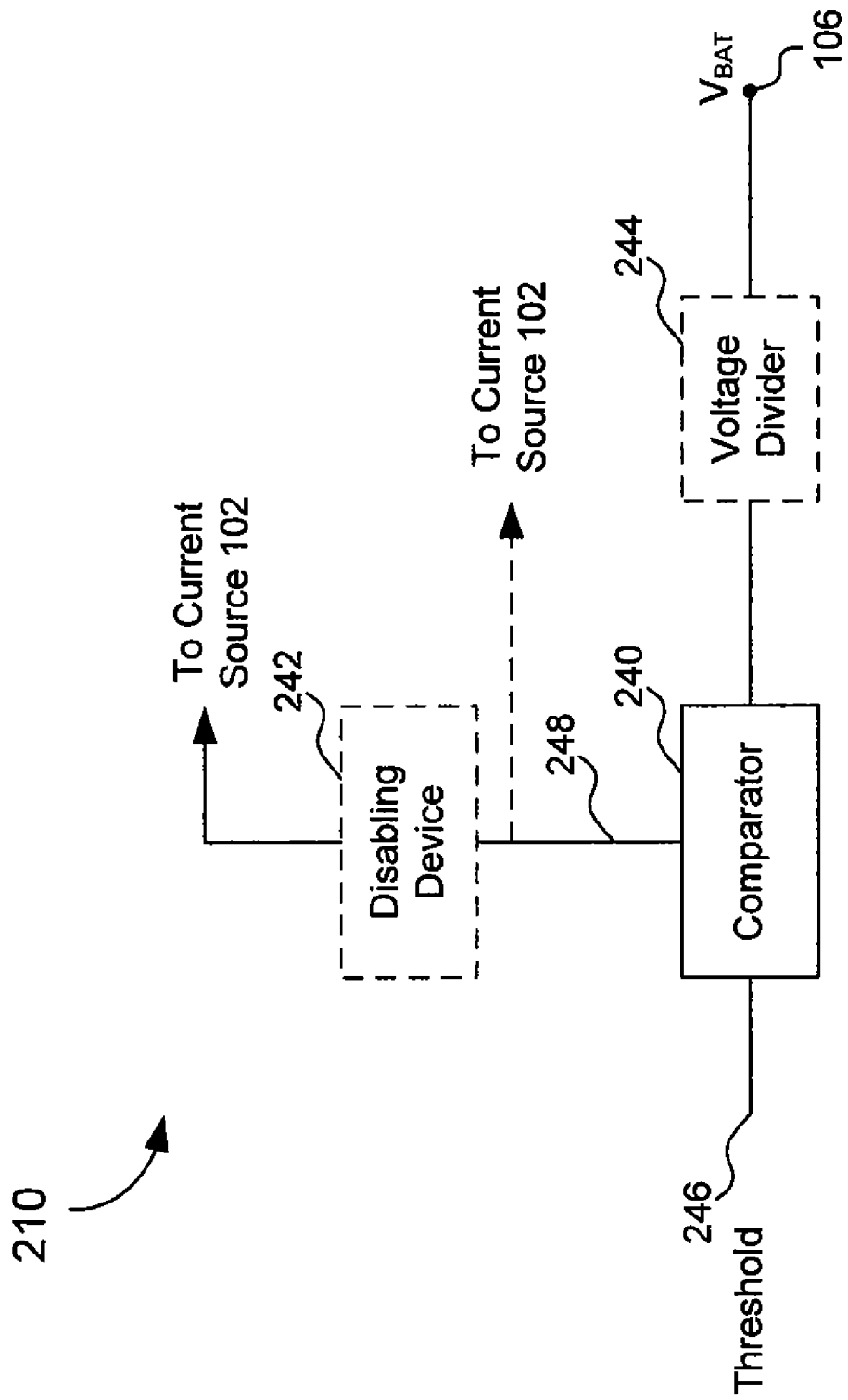
FIG. 2 shows a protection system, according to an embodiment of the present invention.

FIG. 2 shows a protection system 210, according to one embodiment of the present invention. In this example, protection system 210 comprises a comparator 240. Additionally, or alternatively, protection system 210 may comprise a disabling device 242. Further, an optional voltage dividing device 244 is also shown. Comparator 240 compares either a voltage Vbat at node 106, or a divided value of Vbat, to a corresponding threshold value 246 to produce a comparison signal 248. For example, without voltage divider 244 in system 210, threshold voltage 246 may be 5.5V, and with voltage divider 244 in system 210, threshold voltage 246 may be 1.2V. When the voltage Vbat at node 106, or the divided voltage, exceeds threshold value 246, comparison signal 248 triggers disabling device 242 to substantially simultaneously shut down or disable current source 102 (not shown, see FIG. 1).

Additionally, or alternatively, there may be no disabling device 242 in protection system 210, and comparison signal 248 can be received directly at current source 102 or at optional switching device 111. This is shown using the dashed line. This can be done to disable current source 102, when necessary, or to open switching device 111, turning it OFF and stopping flow of current I from current source 102 into node 106.

It is to be appreciated that other configurations for a protection system 110 in FIG. 1 could also be used.

It is to be appreciated that different portions of system 100, power management system 120, and/or handheld device 130 can be a circuit on a single chip, or parts of several circuits on interconnected chips.

Figure 3:
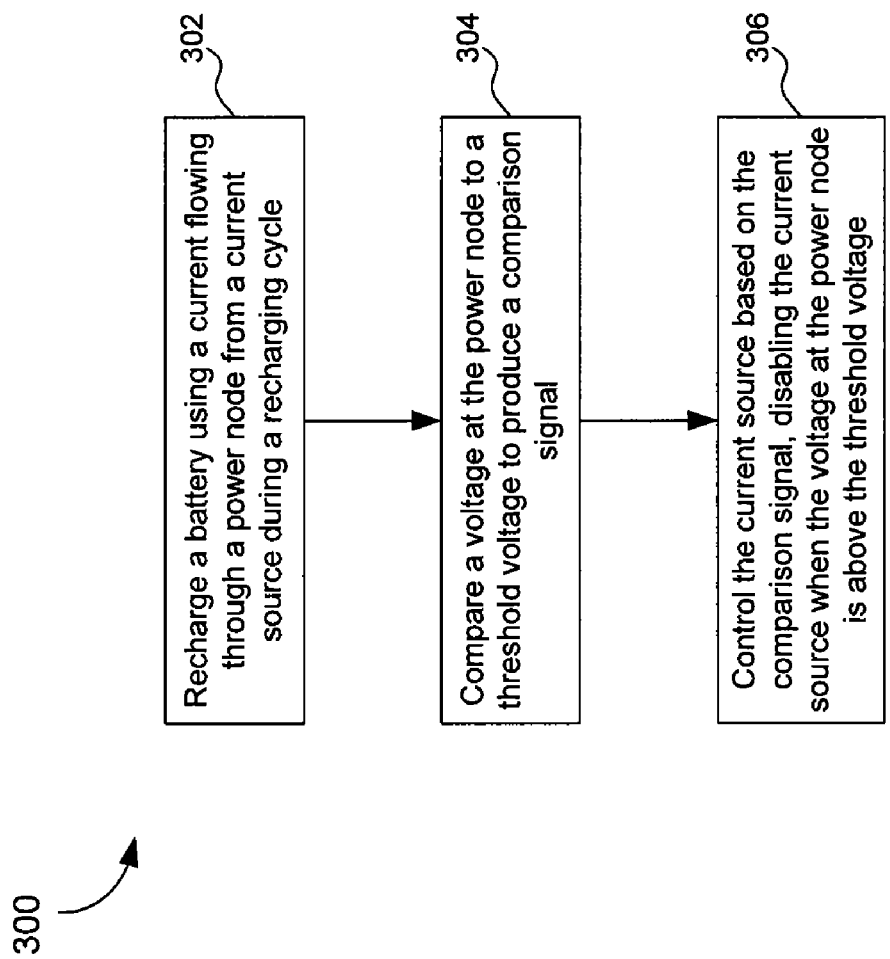
FIG. 3 shows a flowchart depicting a method, according to an embodiment of the present invention.

FIG. 3 shows a flow chart depicting a method 300, according to an embodiment of the present invention. In one example, method 300 can be performed by one or more portions of system 100. In step 302, a battery is recharged using a current flowing through a power node from a current source during a recharging cycle. In step 304, a voltage at the power node is compared to a threshold voltage to produce a comparison signal. In step 306, the current source is controlled based on the comparison signal, wherein when the voltage at the power node is above the threshold voltage the current source is disabled.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A system, comprising:
    a current source coupled to a node and configured to produce a current;
    a rechargeable battery coupled to the node and configured to receive the current through the node during a recharging cycle; and
    an overvoltage protection system coupled between the node and the current source, and configured to disconnect the current source from the node when a voltage at the node exceeds a threshold value in response to disconnection of the rechargeable battery, wherein the current source appears as an open circuit in response to the disconnection of the current source, and wherein the overvoltage protection system is a fast loop system.

2. The system of claim 1, wherein the current source is a slow loop system.

3. The system of claim 1, wherein the overvoltage protection system comprises:
    a comparator configured to compare the voltage at the node to the threshold value, produce a comparison signal therefrom, and disconnect the current source when the comparison signal indicates the voltage at the node exceeds the threshold value.

4. The system of claim 3, further comprising:
    a disabling device coupled between the comparator and the current source, and configured to produce a disabling signal that disconnects the current source when the comparison signal indicates the voltage at the node exceeds the threshold value.

5. The system of claim 3, wherein:
    the overvoltage protection system further comprises a voltage divider coupled between the node and the comparator, which is configured to produce a divided voltage from the voltage at the node; and
    the comparator is configured to compare the divided voltage to the threshold value.

6. The system of claim 1, further comprising:
    a current sensor;
    a voltage sensor; and
    a controller coupled between the current source, the current sensor, and the voltage sensor, such that the controller is configured to control the current source during the, recharging cycle.

7. The system of claim 6, wherein:
    the controller is configured to perform a constant current procedure with respect to the current source using the current sensor during a first respective portion of the recharging cycle; and
    the controller is configured to perform a constant voltage procedure with respect to the current source using the voltage sensor during a second respective portion of the recharging cycle.

8. The system of claim 1, further comprising:
    a power management system coupled to the node, and configured to be powered by the rechargeable battery.

9. The system of claim 1, further comprising:
    a handheld device coupled to the node, and configured to be powered by the rechargeable battery.

10. The system of claim 9, wherein the handheld device is a personal digital assistant, a phone, a computer, a MP3 player, or a video player.

11. The system of claim 1, wherein:
    a handheld device, which operates at a first rated voltage, or a power management system, which operates at a second rated voltage, is coupled to the node, and is configured to be powered by the rechargeable battery; and the threshold value is equal to or below a lower one of the first and second rated voltages.

12. A method comprising:
recharging a battery using a current flowing through a power node from a current source during a recharging cycle;
comparing a voltage at the power node to a threshold value to produce a comparison signal; and
controlling the current source by a fast loop system, based on the comparison signal, wherein when the voltage at the power node is above the threshold value in response to disconnection of the rechargeable battery, the current source is disconnected from the power node and appears as an open circuit.

13. The method of claim 12, further comprising:
controlling the current source using a constant current procedure during a first respective portion of the recharging cycle; and
controlling the current source using a constant voltage procedure during a second respective portion of the recharging cycle.

14. The method of claim 12, further comprising using the battery to power a power management system coupled to the power node.

15. The method of claim 12, further comprising using the battery to power a handheld device coupled to the power node.

16. The method of claim 12, wherein, before the comparison step, the voltage at the power node is divided.

17. The method of claim 12, wherein controlling the current source further comprises controlling the current source by the fast loop system, based on the comparison signal, wherein when the voltage at the power node is above the threshold value in response to disconnection of the rechargeable battery, the current source is disconnected from the power node and appears as an open circuit within about 20 microseconds of when the voltage at the power node is above the threshold in response to disconnection of the rechargeable battery.

18. A circuit comprising:
a current source section coupled between a power source and a power node;
a rechargeable battery that is configured to be recharged using a current from the current source flowing through the power node, the rechargeable battery being coupled between the power node and ground; and
an overvoltage protection section coupled between the power node and the current source, and configured to substantially instantaneously disconnect the current source from the power node when a voltage at the power node exceeds a threshold value in response to disconnection of the rechargeable battery, wherein the current source appears as an open circuit in response to the disconnection of the current source, and wherein the overvoltage protection section is a fast overvoltage loop section,
whereby the threshold value is equal to or below a rated voltage of a device coupled to and powered by the node.

19. The system of claim 1, wherein the overvoltage protection system is further configured to disconnect the current source from the node within about 20microseconds of when a voltage at the node exceeds a threshold value in response to disconnection of the rechargeable battery.

20. The circuit of claim 18, wherein the overvoltage protection section coupled between the power node and the current source is further configured to substantially instantaneously disconnect the current source from the power node within about 20microseconds of when a voltage at the power node exceeds a threshold value in response to disconnection of the rechargeable battery.

21. A system, comprising:
a current source coupled to a node;
a rechargeable battery coupled to the node; and
an overvoltage protection system coupled between the node and the current source, the overvoltage protection system comprising:
a comparator configured to compare the voltage at the node to the threshold value and produce a comparison signal therefrom, and
a disabling device coupled between the comparator and the current source, and configured to produce a disabling signal that disconnects the current source when the comparison signal indicates the voltage at the node exceeds the threshold value, wherein the current source appears as an open circuit in response to the disconnection of the current source wherein the disabling devise is configured to produce a disabling signal that disconnects the current source within about 20 microseconds of when the comparison signal indicates the voltage at the node exceeds the threshold value.

22. The system of claim 21, wherein:
the overvoltage protection system further comprises a voltage divider coupled between the node and the comparator, which is configured to produce a divided voltage from the voltage at the node; and
the comparator is configured to compare the divided voltage to the threshold value.

23. The system of claim 21, further comprising:
a handheld device coupled to the node, and configured to be powered by the rechargeable battery, wherein the handheld device is one of a personal digital assistant, a phone, a computer, a MP3 player, or a video player.

24. The system of claim 21, further comprising:
a current sensor;
a voltage sensor; and
a controller coupled between the current source, the current sensor, and the voltage sensor, such that the controller is configured to control the current source during a recharging cycle.

25. The system of claim 24, wherein:
the controller is configured to perform a constant current procedure with respect to the current source using the current sensor during a first respective portion of the recharging cycle; and
the controller is configured to perform a constant voltage procedure with respect to the current source using the voltage sensor during a second respective portion of the recharging cycle.

* * * * *